March 14, 1967  A. BECHLER  3,308,694
AUTOMATIC LATHE
Filed Nov. 12, 1964  2 Sheets-Sheet 1

INVENTOR.
ANDRÉ BECHLER
BY
McNENNY, FARRINGTON, PEARNE & GORDON
ATTORNEY

March 14, 1967   A. BECHLER   3,308,694
AUTOMATIC LATHE

Filed Nov. 12, 1964                                   2 Sheets-Sheet 2

INVENTOR.
ANDRÉ BECHLER
BY
MCNENNY, FARRINGTON, PEARNE, & GORDON
ATTORNEY

United States Patent Office 3,308,694
Patented Mar. 14, 1967

3,308,694
AUTOMATIC LATHE
André Bechler, 4 Rue Centrale, Moutier, Switzerland
Filed Nov. 12, 1964, Ser. No. 410,802
Claims priority, application Switzerland, Nov. 27, 1963, 14,510/63
10 Claims. (Cl. 82—2)

This invention relates generally to automatic machine tools and more particularly to a novel and improved automatic turret lathe having simplified means for powering tool movement in a longitudinal direction, a transverse direction and for indexing the turret.

An automatic turret lathe incorporating this invention is provided with a slide movable along ways in the bed frame in a longitudinal direction parallel to the turning axis of the lathe. A tool turret is supported on the slide for both rotation about a transverse axis perpendicular to the turning axis and movement along the transverse axis.

A continuously rotating cam support assembly or cam carrier is mounted on the slide and is provided with separate cam means to independently control the longitudinal and transverse movements of the turret and to also control the indexing rotation of the turret. In the preferred embodiment of this invention, each of the cam means is independently adjustable relative to the cam carrier to provide independent adjustment of each of the tool movements. However, once the cam means are mounted automatic timing of the tool movements is achieved since all of the tool movements are initiated by rotation of the single cam carrier.

The rotation of the turret is provided by an independently powered clutch drive which cooperates with a latching mechanism controlled by the movement of the cam carrier. The latching mechanism locks the turret in predetermined indexed positions during tool operation causing the clutch to slip. When the latching mechanism is released the clutch drive automatically rotates the turret to the next predetermined indexed position.

In the illustrated embodiment a cam carrier is journaled in spaced bearings on the longitudinally movable slide by means of a hollow shaft. The tool turret is supported on an axle or shaft which is rotatably supported within the hollow shaft of the cam carrier so that the tool turret and cam carrier rotate about the same axis. The shaft supporting the tool turret is movable along its axis within the hollowed shaft of the cam carrier and is connected to an indexing drive through a friction clutch. The latching mechanism for locking the tool turret in the predetermined indexed positions is mounted on the slide and is arranged to positively position the tool turret in the indexed position even though the tool turret may move transversely relative to the slide.

It is an important object of this invention to provide a novel and improved automatic turret lathe having simplified cam means for controlling the movement of the tool turret with respect to a rotating work holder.

It is another object of this invention to provide a novel and improved automatic lathe having simplified cam means for driving the tool carrier both longitudinally and transversely relative to the rotating work holder wherein both movements of the tool holder are powered from a single source and are automatically timed with respect to each other.

It is still another object of this invention to provide a novel and improved automatic turret lathe having a friction drive for powering the indexing operation in combination with cam operated mechanical latch means to hold the turret against indexing movement in predetermined indexed positions.

It is still another object of this invention to provide a novel and improved automatic turret lathe having a tool carrying turret transversely movable with respect to the turning axis of the work holder in combination with a friction drive for indexing the turret and a latch means insensitive to transverse movement of the turret operable to positively maintain the turret in predetermined indexed positions.

It is still another object of this invention to provide an automatic turret lathe having a slide longitudinally movable in a direction parallel to the turning axis of the lathe, a cam carrier journaled on the slide for rotation about a transverse axis perpendicular to the turning axis and a tool carrying turret journaled on the slide for rotation and axial movement relative to said axis wherein separate cam means on the cam carrier control the longitudinal movement of the slide, the transverse movement of the tool turret and the indexing rotation.

Further objects and advantages will appear from the following description and drawings wherein.

Figure 1:
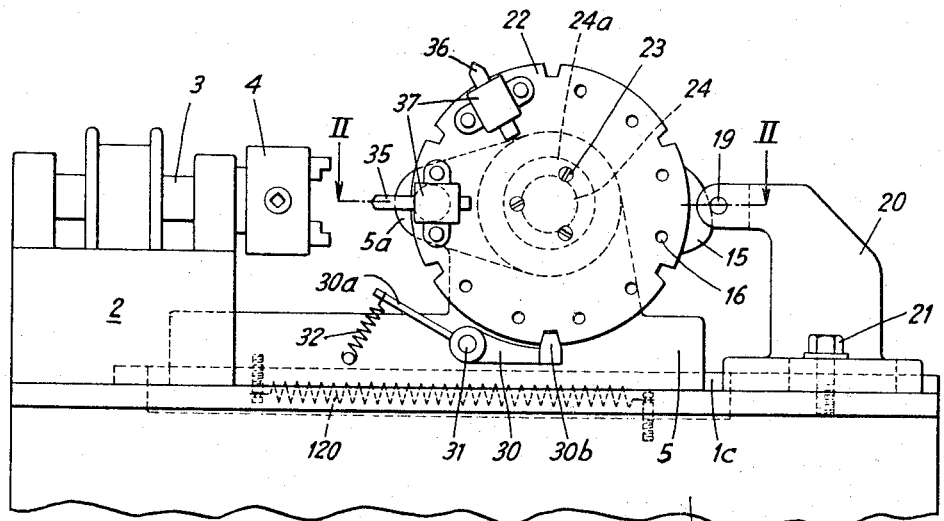
FIGURE 1 is a side elevation of an automatic turret lathe incorporating this invention.

The lathe is illustrated in the drawings somewhat diagrammatically in order to simplify the understanding of this invention. The illustrated embodiment includes a generally rectangular bed frame 1 including a trough portion 1a. A head stock 2 is provided at one corner of the frame 1 on which a work spindle 3 is journaled for rotation about its longitudinal turning axis. A chuck 4 is mounted on one end of the spindle 3 to support the work piece during the turning operation. The drive for the spindle 3 and the structure of the chuck 4 can be of any suitable type and forms no part of this invention except insofar as it cooperates with the other elements of the invention.

The frame 1 is provided with a rearward portion 1b having ways 1c which support a slide 5 for longitudinal movement relative to the frame 1 in a direction parallel to the turning axis of the spindle 3.

The slide 5 is formed with spaced bearings 5a and 5b having a common axis in the same horizontal plane as the axis of the spindle 3 and perpendicularly intersecting a turning axis.

A cam supporting assembly includes a hollow shaft 6 journaled in the bearings 5a and 5b for rotation about the axis of the bearings 5a and 5b and an annular cam supporting member 7 supported by the hollow shaft 6 between the bearings 5a and 5b. A set screw 8 locks the shaft 6 and cam supporting member 7 against relative movement. The end of the member 7 engages the bearings 5a and 5b so the hollow shaft 6 and the cam supporting member 7 are locked in axial movement but are free to rotate about the transverse axis.

Drive means are provided to continuously rotate the cam support member 7 and the hollow shaft 6. The drive includes a step pulley 9 mounted on a cross shaft 10 which is journaled in bearings 11 secured to the bearing 5b. A worm gear 12 is mounted on the shaft 10 and meshes with a worm wheel 13 secured to the cam member 7 by bolt 14. Power to rotate the pulley 9 is preferably provided by an electric motor and a belt (not shown).

The cam supporting member 7 is formed with a radially extending flange provided with a plurality of threaded longitudinally extending holes 7a which are symmetrically arranged around the periphery of the cam supporting member. One or more first cams 15 are mounted on a cam supporting member 7 by means of bolts 16 threaded into the tapped holes 7a. These first cams 15 function to control the longitudinal movement of the slide 5 along the ways 1c by engaging a cam follower 19 mounted on a stop block 20 adjustably secured to the portion 1b of the bed frame by means of bolts 21. In the illustrated embodiment the stop block 20 is provided with slots through which the bolts 21 extend so that longitudinal adjustment of the stop block, and in turn the cam follower 19, is provided. A return spring 120 is mounted between the bed frame 1 and the slide 5 and resiliently urges the slide in a direction toward the stop block 20. This spring functions resiliently to maintain the slide in its rearward position excepting when the first cam 15 is rotated into engagement with the cam follower 19 by the cam supporting member 7. The cam 15 is shaped to move the slide 5 to the left as viewed in FIGURES 1 and 2 against the action of the spring 120 in a predetermined manner. As soon as the cam 15 rotates past the cam follower 19, it allows the spring 120 to return the slide to its rearward position. Therefore, the longitudinal movement of the slide is controlled by the shape and position of the first cam or cams 15.

Figure 2:
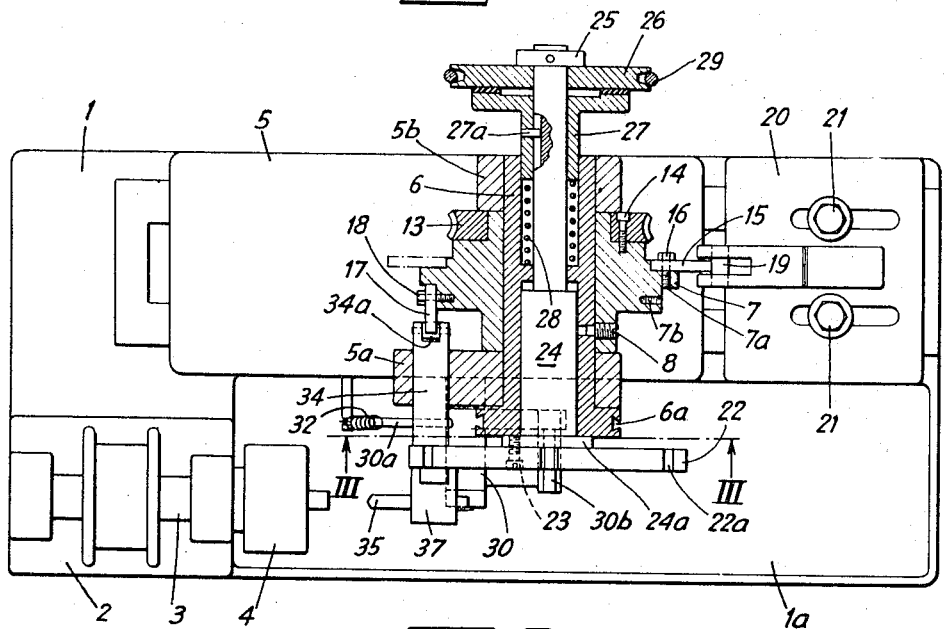
FIGURE 2 is a plan view of the lathe illustrated in FIGURE 1 partially in section along II—II of FIGURE 1.

A shaft 24 is journalled in the hollow shaft 6 for rotation about the transverse axis and is provided with an end plate 24a engageable with the forward end of the hollow shaft 6 to limit axial movement of the shaft 24 in the rearward direction to the position illustrated in FIGURE 2. A tool turret 22 is mounted on the end plate 24a by bolts 23.

Power to rotate the turret 22 is provided by clutch drive including a pulley 26 journaled on the rearward end of the shaft 24 for free rotation relative thereto between a stop ring 25 and a clutch member 27. The clutch member 27 is locked against rotation relative to the shaft 24 by a key pin 27a which extends into an axially extending slot in the shaft 24. Therefore, the clutch member 27 is locked against rotation relative to the shaft but is axially movable relative thereto. Friction material on the clutch member 27 engages the pulley 26 to provide a driving connection which can slip when the turret 22 and shaft 24 are locked in an indexed position. A spring 28 extends between a shoulder on the hollow shaft 6 and the end of the clutch member 27 resiliently urging the clutch member 27 toward the pulley 26 to maintain the frictional engagement therebetween.

The shaft 24 is mounted so that it is free to move axially against the action of the spring 28 in a forward direction from the rearward position illustrated in FIGURE 2 to permit transverse movement of the tool carried on the turret 22.

To accomplish this transverse movement, one or more second cams 17 are mounted upon the cam supporting member 7. The cam supporting member 7 is formed with a plurality of symmetrically arranged threaded holes 7b opening radially into a cylindrical portion of the cam supporting member 7. One or more second cams 17 are mounted by means of bolts 18 threaded into the tapped holes 7b so that they extend generally axially with respect to the cam supporting member. A push bar 34 is mounted in a lateral extension on the bearing 5a for axial movement relative to the slide 5. The cam follower 34a mounted on the rearward end of the push bar 34 is positioned for engagement by the second cam 17 as the cam supporting member 7 rotates. The forward end of the push bar 34 engages the rearward side of a tool supporting turret 22. Therefore, as the second cams 17 are carried into engagement for the cam follower 34a the push bar 34 is pushed forward and causes the tool supporting turret 22 and shaft 24 to move transversely of the lathe against the action of this spring 28. After the second cam 17 passes the follower 34a the spring 28 again returns the turret to the rearward position illustrated in FIGURE 2. The transverse movement of the turret is therefore controlled by the location and shape of the second cam or cams 17.

The single power source used to rotate the cam supporting member 7 therefore produces both the longitudinal and the transverse movements of the tool supporting turret 22. The location and the number of cams on the tool supporting member 7 can be changed as required to meet the particular schedule of machining operation necessary to produce any particular work piece. Also, the shape of the cams can be changed to change the rate and extent of the movement produced by each cam.

In order to lock the turret 22 in indexed position a latching lever 30 is pivoted at 31 on the slide 5 and is provided with a latch projection 30b proportional to fit into mating notches 22a symmetrically formed on the periphery of the tool turret 22 and lock the turret against rotation. When the latching projection 30b is moved out of the notches, the drive provided by the clutch member 27 produces rotation of the turret 22 to bring the subsequent notch into alignment to receive the latch projection 30b. The latch lever 30 is provided with an arm 30a connected to a spring 32 which resiliently urges the latching lever in an anti-clockwise direction around the pivot 31 as viewed in FIGURE 1 thereby resiliently urging the latch projection 30b toward the turret 22.

Figure 3:
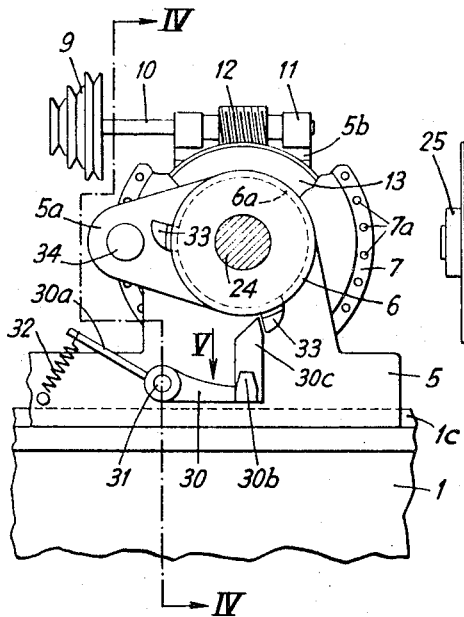
FIGURE 3 is a vertical section taken along III—III of FIGURE 2 with a portion of the cam supporting assembly broken away to permit illustration of the drive for the cam supporting assembly.
Figure 4:
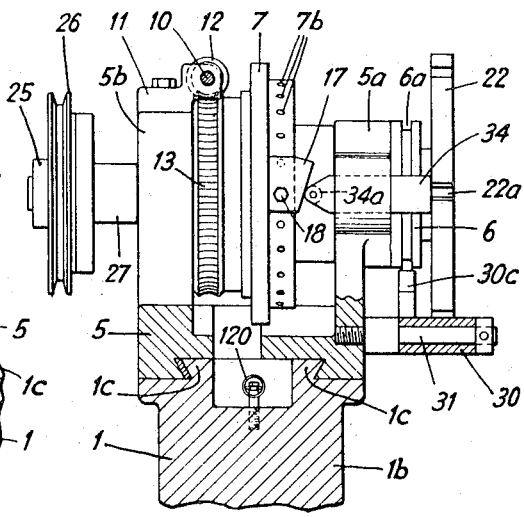
FIGURE 4 is a broken section taken along IV—IV of FIGURE 3.
Figure 5:
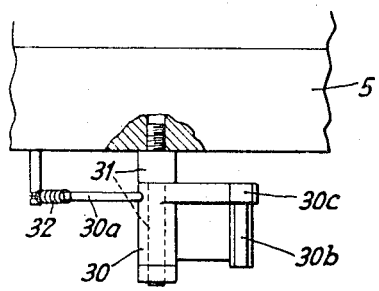
FIGURE 5 is a fragmentary plan view taken in the direction of the arrow V in FIGURE 3.

In order to release the turret for indexing rotation, a third cam mechanism is provided. In this instance, the cam is mounted in a cam supporting groove 6a formed in the end of the hollow shaft 6. One or more third cams 33 are mounted in the groove 6a as best illustrated in FIGURE 3 and are proportioned to engage a vertically extending projection 30c on the latch lever 30. These cams are proportioned to press the latch lever 30 in a clockwise direction against the action of the spring 32 to move the latch projection 30d out of the mating notch 22a. As soon as the latching projection 30d moves out of the notch, the turret 22 is rotated through the clutch drive to bring the subsequent notch into position to receive the latch projection 30c. By this time the third cam 33 has moved clear of the projection 30c and the spring 32 snaps the latch projection 30c into the subsequent notch and the turret is again locked in an indexed position.

Suitable tools such as 35 and 36 are mounted by means of tool holders 37 on the face of the tool turret and are shaped to perform the desired operations on a work piece supported by the chuck 4.

Figure 6:
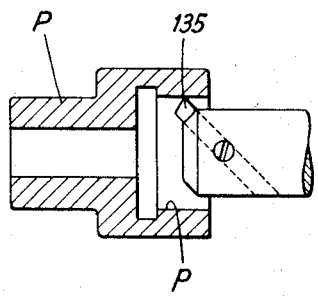
FIGURE 6 is a fragmentary longitudinal section of a representative work piece illustrating how a tool carried by the tool turret may be used to machine a work piece carried by the rotating work holder.

In operation the chuck 4 rotates a work piece about the turning axis. The cam supporting member 7 and the hollow shaft 6 are continuously driven by a motor connected to the pulley 9 and the pulley 26 continuously rotated by a belt 29. Rotation of a first cam 15 into engagement with the cam follower 19 causes longitudinal movement of the slide which carries the turret and tool in the operating position 35 toward the chuck. When cross or transverse feeding is required the second cam 17 moves into engagement with its cam follower 34a and causes transverse movement of the shaft 24, turret 22 and tool 35. The first and second cams can be shaped in any required manner to produce the required machining operation. If a taper is to be cut the cams provide an operation wherein the cutting tool is simultaneously moved transversely and longitudinally relative to the work piece In other instances sequential tool feeding may be produced by properly positioning and shaping the cams. A work piece P shown in FIGURE 6 may require transverse feeding of the tool 135 from the position illustrated.

In such instance it is necessary for the first cam 15 to move the tool 135 longitudinally into the piece P to bring it into alignment with the area requiring machining. The second cam 17 would then be proportioned to cause transverse feeding while the tool is located in the position illustrated. When the machining operations required for the tool 35 are completed and the tool is moved clear of the work piece, and one of the third cams 33 moves into engagement with the projection 30c causing the latch projection 30b to release the turret for rotation for the next position which would bring the tool 36 into alignment with the work piece.

Because all three of the cams 15, 17 and 33 are supported on the same cam supporting assembly, proper timing of the automatic operation of the machine is insured by properly mounting the cams and versatility is achieved because the cams can be shaped and located as required to perform substantially any desired machining operation.

Although a preferred embodiment of this invention is illustrated, it is to be understood that various modifications and rearrangements of parts may be resorted to without departing from the scope of the invention as defined in the following claims.

What is claimed is:

1. An automatic lathe comprising a bed frame, a work support carried by said bed frame journaled for rotation about a turning axis, a slide movable on said frame in a longitudinal direction, a turret journaled on said slide for rotation about a transverse axis contained in the plane perpendicular to said longitudinal direction and movable therealong, and cam means journaled on said slide for rotation relative thereto, said cam means operating to independently produce timed longitudinal movement of said slide and transverse movement of said turret in response to rotation of said cam means.

2. An automatic lathe according to claim 1 wherein said cam means includes a hollow shaft journaled on said slide for rotation about said transverse axis, and said turret is supported by a second shaft journaled in said hollow shaft, said second shaft being axially movable relative to said hollow shaft.

3. An automatic lathe comprising a bed frame, a work support carried by said bed frame journaled for rotation about a turning axis, a slide movable on said frame in a longitudinal direction, a turret journaled on said slide for rotation about a transverse axis contained in the plane perpendicular to said longitudinal direction and movable therealong, cam means journaled on said slide for rotation relative thereto, said cam means operating to independently produce longitudinal movement of said slide, transverse movement of said turret and to control indexing rotation of said turret in response to rotation of said cam means, and clutch means operable to rotate said turret about said transverse axis.

4. An automatic lathe comprising a bed frame, a work support carried by said bed frame journaled for rotation about a turning axis, a slide movable on said frame in a longitudinal direction parallel to said turning axis, a turret journaled on said slide for rotation about a transverse axis contained in the plane perpendicular to said longitudinal direction and movable therealong, a continuously rotatable cam support assembly journaled on said slide for rotation about said transverse axis, and cam means adjustably carried by said cam support assembly operating to independently produce timed longitudinal movement of said slide, transverse movement of said turret and indexing movement of said turret in response to rotation of said cam means.

5. An automatic lathe comprising a bed frame, a work support journaled on said bed frame for rotation about a turning axis, a slide movable on said frame in a longitudinal direction, a continuously rotatable hollow cam support assembly journaled on said slide for rotation about a transverse axis, a tool support mounted in said cam support assembly for axial movement along said transverse axis from a rearward position, a fixed stop on bed frame, separate first and second cam supporting portions on said cam support assembly each adapted to support cams in a plurality of positions symmetrically arranged with respect to said transverse axis, first cam means mounted on said first mounting portion coacting with said fixed stop to move said slide in said longitudinal direction in response to rotation of said cam support assembly, second cam means mounted on the said second mounting portion cooperating with said tool support to move said tool support axially along said transverse axis away from said rearward position in response to rotation of said cam support assembly.

6. An automatic lathe according to claim 5 wherein spring means resiliently urge said slide toward said fixed stop and said tool support toward said rearward position.

7. An automatic lathe comprising a bed frame, a work support journaled on said bed frame for rotation about a turning axis, a slide movable on said frame in a longitudinal direction, a continuously rotatable hollow cam support assembly journaled on said slide for rotation about a transverse axis, a turret journaled in said cam support assembly for rotation about said transverse axis and axially movable therealong in one direction from a rearward position, a fixed stop on bed frame, separate first, second and third cam supporting portions on said cam support assembly each adapted to support cams in a plurality of positions symmetrically arranged with respect to said transverse axis, first cam means mounted on said first mounting portion coacting with said fixed stop to move said slide in said longitudinal direction, second cam means mounted on the said second mounting portion cooperating with said turret to move said turret axially along said transverse axis from said rearward position, indexing drive means adapted to rotate said turret about said transverse axis, latch means locking said turret in predetermined indexed positions, and third cam means mounted on said third mounting portion operating to release said latching means in response to rotation of said cam support assembly.

8. A lathe according to claim 7 wherein said latching means includes a latch projection having a uniform cross-section and extending parallel to said transverse axis, and said turret includes a plurality of symmetrically arranged notches adapted to receive said latch projection whereby said latching means operates to lock said turret in indexed position while permitting movement of said turret along said transverse axis.

9. An automatic lathe comprising a bed frame, a work support journaled on said bed frame for rotation about a turning axis, a slide movable on said frame in a longitudinal direction parallel to said turning axis from a retracted position, a continuously rotatable hollow cam support assembly journaled on said slide for rotation about a transverse axis contained in a plane perpendicular to said longitudinal direction, a turret journaled in said cam support assembly for rotation about said transverse axis and axially movable therealong in one direction from a rearward position, a fixed stop on bed frame, separate first, second and third cam supporting portions on said cam support assembly each adapted to support cams in a plurality of positions symmetrically arranged with respect to said transverse axis, first cam means mounted on said first mounting portion coacting with said fixed stop to move said slide in said longitudinal direction from the said retracted position, second cam means mounted on the said second mounting portion cooperating with said turret to move said turret axially along said transverse axis from said rearward position, friction clutch drive means adapted to rotate said turret about said transverse axis, latch means locking said turret in predetermined indexed positions, third cam means mounted on said third mounting portion operating to release said latching means in response to rotation of said cam support assembly, and spring means operating to engage said friction clutch drive means and also urge said turret toward said rearward position.

10. An automatic lathe comprising a bed frame, a work holder journaled on said bed frame for rotation about a turning axis, a slide mounted on said bed frame for movement relative thereto in a first direction parallel to said turning axis, a tool turret mounted on said slide for rotation about a transverse axis perpendicularly intersecting said turning axis, a continuously rotatable cam carrier journaled on said slide, first cam means operable between said cam carrier and said bed frame producing longitudinal movement of said slide relative to said frame in said first direction in response to rotation of said cam carrier, second cam means operable between said cam carrier and turret moving said turret along said transverse axis in response to rotation of said cam carrier, drive means operable to rotate said tool turret, latch means on said slide operable to lock said tool turret against rotation in predetermined positions, and third cam means operable between said cam carrier and latch means releasing said latch means in response to rotation of said cam carrier.

No references cited.

WILLIAM W. DYER, JR., *Primary Examiner.*
LEONIDAS VLACHOS, *Examiner.*